Figure 1:
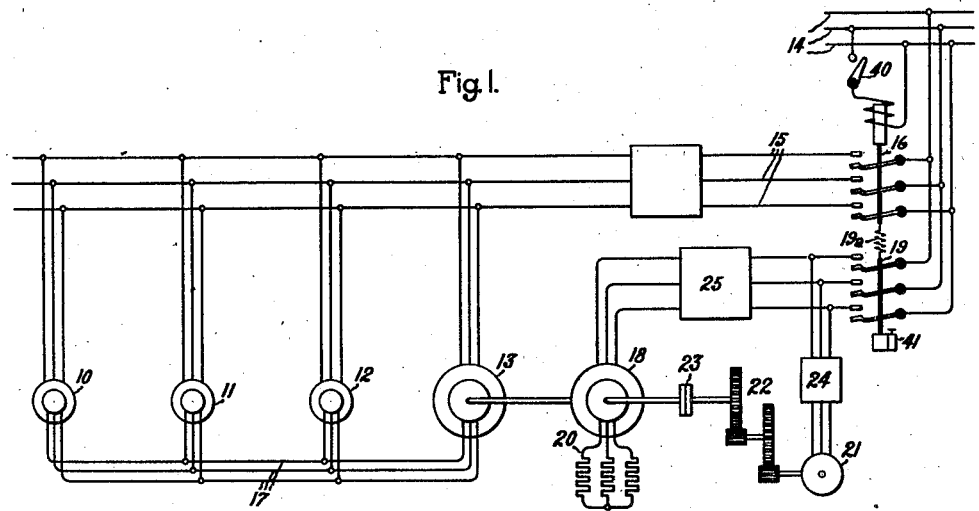

Aug. 15, 1933.  W. DE VRIES  1,922,885
PLURAL MOTOR DRIVE
Filed April 20, 1932

Inventor:
Walter de Vries,
by  *Charles E. Mullen*
His Attorney.

Patented Aug. 15, 1933

1,922,885

UNITED STATES PATENT OFFICE 1,922,885

PLURAL MOTOR DRIVE

Walter de Vries, Berlin, Germany, assignor to General Electric Company, a Corporation of New York Application April 20, 1932, Serial No. 606,502, and in Germany April 21, 1931

6 Claims. (Cl. 172—293)

This invention relates to plural motor drives in which each of a plurality of motors is employed to drive a section of a machine such for example as a rotary printing press; more particularly the invention relates to plural motor drives in which the various sections of the driven machine are synchronized with each other at all speeds from standstill to top speed by means of electrical synchronizing devices, and it has for an object the provision of a simple reliable and improved system of this character.

More specifically the invention relates to plural motor drives in which the various sections of the driven machine are synchronized at all speeds by means of alternating current motors having their primary windings connected to a supply source and having their secondary windings connected together, and a further object of the invention is the provision of a system utilizing synchronizing motors of minimum size together with the provision of means for starting these synchronizing motors from rest and operating at low threading speeds without exceeding the maximum permissible temperature rise.

In an embodiment of the invention, the synchronizing motors may themselves be employed to drive the sections of the machine or the sections of the machine may be driven by regular driving motors, such for example as direct current motors and the synchronizing motors merely employed for synchronizing the actual driving motors. By driving the rotors of the synchronizing motors in a direction that is opposite to the direction of rotation of the rotating magnetic field of the primary winding, large synchronizing torques are obtained at all speeds from standstill to top speed. The rotor of one of the synchronizing motors is mechanically driven by means of an auxiliary motor to provide for starting the machine from rest and operating at low threading speed. Although this last mentioned synchronizing motor is actually constructed as a motor, it is referred to as a unit generator because when its rotor is driven by any suitable driving means the electrical power necessary to maintain the various synchronizing motors in synchronism with each other traverses the rotor windings of this particular synchronizing motor and because of this fact its capacity must be substantially equal to the combined capacity of the remaining synchronizing motors.

In this form of the invention it is of course desirable from an economic point of view that these synchronizing motors be constructed as small as is consistent with the torque requirement for starting the sections of the driven machine from rest. However, these motors remain in operation for very considerable periods of time during threading. Consequently, if designed merely to meet the starting torque requirement and if operated for relatively long periods of time for threading at the same flux density as at starting, over-heating occurs and the maximum permissible temperature rise is exceeded due to the unfavorable cooling conditions arising from the small dimensions of these motors.

In carrying the invention into effect in one form thereof the magnetic fields of the synchronizing motors are strengthened at starting to a value that is materially in excess of the normal field strength during the continuous running operation. In this manner it is possible to employ synchronizing motors of minimum size with respect to the starting torque requirement while providing satisfactory continuous operation at low threading speed without subjecting the motor to temperature rises in excess of the maximum permissible value.

In a specific embodiment of the invention the arrangement is such that when the synchronizing motors are connected to the supply source, normal full voltage is applied to but a portion of the stator windings of each sectional synchronizing motor for a predetermined interval of time at the expiration of which normal full voltage is applied to the entire winding.

Figure 2:
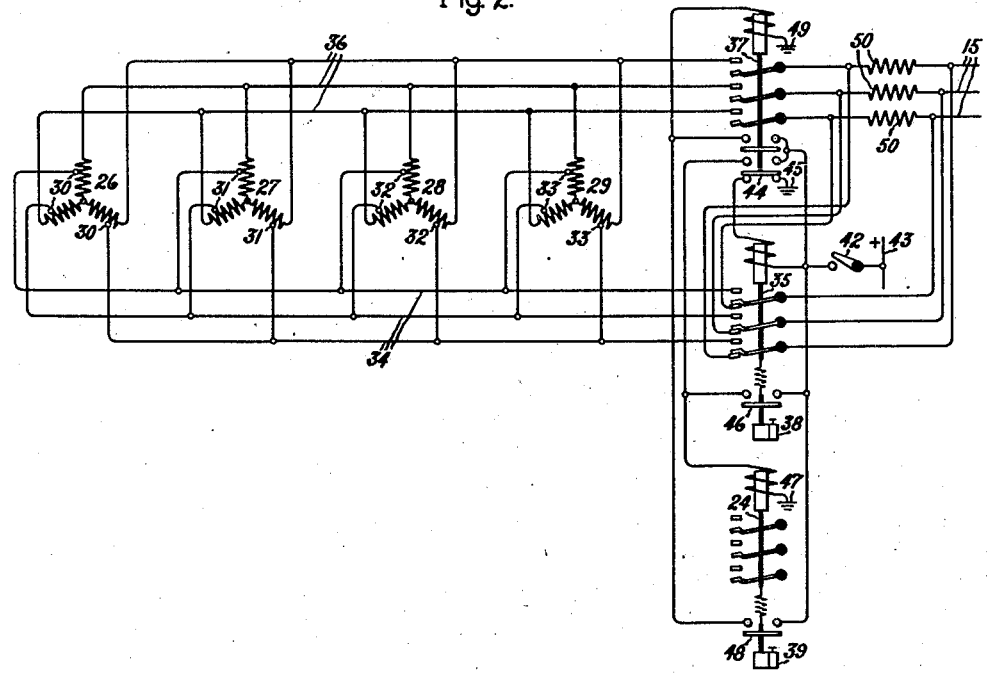

For a better and more complete understanding of the invention, reference should now be had to the following specification and to the accompanying drawing in which Fig. 1 is a diagrammatical representation of a sectionalized motor drive in which alternating current motors are utilized to synchronize the various sections of the driven machine, and Fig. 2 is a diagrammatical representation of an embodiment of the invention as applied to the primary windings of the sectional synchronizing motors of Fig. 1.

Referring now to the drawing the drive shaft of a plurality of sections of a sectionalized machine such for example as a rotary printing press (not shown) are each mechanically coupled to the corresponding rotor member of a plurality of alternating current motors 10, 11, 12, and 13 which for the purpose of illustration are shown as alternating current motors of the wound rotor induction type. The primary windings of the synchronizing motors 10, 11, 12, and 13 are supplied from any suitable source of power such for example as that represented in the drawing by the supply lines 14 to which they are connected by means of the supply buses 15 and the line switch 16 illustrated as an electromagnetic contactor. As shown the rotor windings of each of the synchronizing motors 10, 11, 12, and 13 are connected with each other by means of electrical connections 17 to provide for synchronous operation of these motors. The rotor of synchronizing motor 13 or unit generator is mechanically coupled to the rotor of a large driving motor 18 which for the purpose of illustration is shown as an alternating current motor of the wound rotor induction type having its primary winding supplied from any suitable source of power, such for example as source 14 to which it is connected by any suitable connecting means such for example as the line switch 19. A suitable secondary resistance device 20 controlled by a suitable controller (not shown) is connected to the rotor winding of this motor for suitably controlling its speed. Preferably the actual arrangement as applied to a printing press is such that the drive shaft of the unit generator 13 and the driving motor 18 are mechanically coupled to a section of the printing press such for example as the folding apparatus. The drive motor 18 is connected to the source 14 in such a manner that it drives the rotor member of the unit generator 13 in a direction that is opposite to the direction of the rotating magnetic field of its primary winding, and since the rotor windings of the generator 13 are electrically connected to the rotor windings of the synchronizing motors 10, 11, and 12, the primary windings of which are supplied from the same source of power as that from which the primary winding of the unit generator 13 is supplied, the synchronizing motors 10, 11, 12, and 13 are caused to operate in synchronism with the rotor of the unit generator 13 due to the synchronizing torque set up by the currents that tend to flow in the synchronizing connections 17 in the event that the rotor of any of the motors 10, 11, and 12 tend to depart from synchronism with the rotor of the machine 13.

In order to obtain the low threading speed necessary for rotary printing presses, an auxiliary motor 21 is employed which serves to drive the rotor of the sectional drive motor 18 through suitable reduction gearing 22 and a clutch 23. Power is supplied to the auxiliary motor 21 from any suitable source, such for example as the source 14 to which it is arranged to be connected by means of the line switch 19; suitable switching devices 24 and 25 being included in the connections between the source 14 and the auxiliary motor 21 and the sectional driving motor 18 for the purpose of deenergizing one of these motors when the other is energized and vice versa.

In Fig. 2 of the drawing, the primary or stator windings 26, 27, 28, and 29 of the synchronizing motors 10, 11, 12, and 13 respectively are shown as being provided with intermediate taps. For example the primary winding 26 is provided with intermediate taps 30, the primary winding 27 with intermediate taps 31, the primary winding 28 with intermediate taps 32 and the primary winding 29 with intermediate taps 33. As shown, the intermediate taps of the corresponding legs of each winding are connected together by means of conductors 34 and are arranged to be connected to the conductors 15 by means of a switching device 35 illustrated as an electromagnetic contactor. Similarly the terminals of the corresponding legs of the primary windings 26, 27, 28, and 29 are connected to each other by means of the conductors 36 and are arranged to be connected to the conductors 15 leading to the supply source 14 by means of the electromagnetic switching device illustrated as the contactor 37. The switching device 24 for the auxiliary motor 21 is illustrated in Fig. 2 as an electromagnetic contactor, the energizing circuit for the operating coil of which is completed a predetermined interval of time after the operation of the contactor 35 by means of a time element device 38 which is set in operation in response to the closing operation of the contactor 35. Likewise the contactor 24 is provided with a time element device 39 for completing the energizing circuit for the operating coil of the contactor 37, a predetermined interval of time after the closing operations of the contactors 35 and 24.

With the above understanding of the apparatus and its organization in the completed system, the operation of the system itself will readily be understood from the detailed description which follows:

Assuming the contact device 40 to be operated to the closed position an energizing circuit is established for the operating coil of the line switch 16 extending from the middle supply line 14 to the lower supply line and in responding to the energization of its operating coil, the contactor 16 closes and a predetermined interval of time thereafter, which is determined by the setting of the dash pot 41, the line switch 19 is also operated to the closed position due to the tension imparted to the spring 19a by the closing operation of the contactor 16. Thereafter, the contact device 42, which may be a push button or any other suitable type of switch, is operated to the closed position to establish an energizing circuit for the operating coil of the contactor 35 which extends from the positive side of a supply source 43, through the operating coil of the contactor 35, through the interlock 44 of the contactor 37 in the lower position thereof to the opposite side of the supply source 43 represented by the ground 45. In responding to the energization of its operating coil the contactor 35 is operated to the upper closed position in which it serves to connect the intermediate taps 30, 31, 32, and 33 of the synchronizing motors to the supply source 14 through the conductors 15 whereby the normal supply voltage of the source 14 is applied to but a portion of the primary or stator windings of these motors thereby increasing the strength of the magnetic fields of these motors to a value that is materially in excess of the normal magnetization for continuous operation.

At the end of a predetermined time interval, the duration of which is determined by the setting of the time delay device 38, an energizing circuit for the operating coil of contactor 24 is established from the positive supply line 43, through contact device 42, lower auxiliary contact 46 of the contactor 35 in the closed position, operating coil of contactor 24 to the opposite side of the supply source represented by the ground 47. Contactor 24 is operated to the upper or closed position in response to the energization of its operating coil and in this position it connects the auxiliary motor 21 to the supply source 14 through previously closed line switch 19. The rotor of the synchronizing motor 13 is thereupon driven at low threading speed by the auxiliary motor 21 through the reduction gearing 22 and the rotors of the synchronizing motors 10, 11, and 12 are maintained in synchronism with the rotor of the synchronizing motor 13 as previously described. At the expiration of a short time interval the duration of which is determined by the setting of the time delay device 39 an energizing circuit is established for the operating coil of contactor 37 extending from the positive side of the source 43, through contact device 42, lower auxiliary contact 48 of the contactor 24 in the closed position, operating coil of the contactor 37 and thence to the opposite side of the supply source represented by the ground 49. The contactor 37 in responding to the energization of its operating coil connects the terminals of the primary windings 26, 27, 28, and 29 to the supply source 14 through the impedance device 50 and the conductors 15. In the closed position of the contactor 37 the energizing circuit for the contactor 35 is interrupted by the lower auxiliary contact 44 of the contactor 37 through which this energizing circuit was previously traced. As a result of the deenergization of its operating coil, the contactor 35 is operated to its lower position in which it connects the line terminals of the primary windings 26, 27, 28, and 29 to the supply source 14 thereby short circuiting the impedance device 50. Contactor 35 in its lower position does not interrupt the energizing circuit for the operating coil of contactor 24 since the lower auxiliary contact 44 of contactor 37 in its closed position establishes a holding circuit for the operating coil of contactor 24 independently of the auxiliary contact 46 of contactor 35. Thus after the synchronizing motors 10, 11, 12, and 13 have started the sections of the driven machine from rest, the voltage applied to the primary windings of these motors is reduced to normal value and thereafter the driven machine is operated at low threading speed as long as the auxiliary motor 21 is maintained energized. By means of the above connections, it is seen that during the starting period the synchronizing motors develop the increased torque required for breaking the parts of the driven machine from rest and after a short interval of time they impart their normal torque to the machine without developing any unpermissible temperature rise. Thus by means of the invention a system is provided utilizing synchronizing motors of minimum size and at the same time providing the necessary starting torque and low threading speed operation without exceeding the maximum permissible temperature rise.

Although in accordance with the provisions of the patent statutes, I have described this invention as embodied in concrete form, I would have it understood that the invention is not limited to the apparatus and connections shown in the drawing and described in the specification which are merely illustrative since alterations and modifications will readily suggest themselves to persons skilled in the art without departing from the true spirit of the invention or from the scope of the annexed claims.

What I claim as new and desire to secure by Letters Patent of the United States, is:

1. In combination, a plurality of alternating current motors each having a primary winding and a secondary winding, said secondary windings being connected together to provide synchronous operation of said motors, means for starting said motors from rest, means operable at starting for connecting a portion of each primary winding to a voltage source to increase the strength of the magnetic fields of said motors above the normal strength of said fields for continuous operation, and means for connecting the entire primary winding of each of said motors to said source to decrease the field strength of said motors to normal value after a predetermined interval of time.

2. In combination, a plurality of alternating current motors each having a primary winding and a secondary winding, said secondary windings being connected together to provide synchronous operation of said motors, means for starting said motors, means for applying normal full voltage to a portion of the primary winding of each of said motors at starting, and means for applying normal full voltage to substantially the entire primary winding of each of said motors after a predetermined time interval.

3. A plural motor drive comprising a plurality of alternating current motors each having a primary winding and a secondary winding, said secondary windings being connected together to provide synchronous operation, starting means comprising a switching device for connecting a portion of the primary winding of each of said motors to a supply source, a second switching device for connecting substantially the entire primary winding to said source, and a time element device for delaying the operation of said second switching device a predetermined time interval after the operation of said first mentioned switching device.

4. A plural motor drive comprising a source of alternating current, a plurality of alternating current motors each provided with a primary and a secondary winding, electrical connections between said secondary windings providing synchronous operation of said motors, a switching device for connecting a portion of each of said primary windings to said source, a second switching device responsive to operation of said first mentioned switching device for connecting substantially the entire primary winding of each of said motors to said source, and time element means set in operation by operation of said first mentioned switching device for delaying the operation of said second switching device for a predetermined interval of time after operation of said first mentioned switching device.

5. A plural motor drive for sectionalized printing presses and the like comprising a source of alternating current, a plurality of alternating current motors, one for each section of the press and each of said motors being provided with a primary and a secondary winding, electrical connections between the secondary windings providing synchronous operation of said motors, an auxiliary motor for driving the rotor of one of said synchronizing motors at low speed in a direction opposite to the direction of rotation of the rotating magnetic field of said synchronizing motor, an electromagnetic switching device for connecting a portion of said primary windings to said supply source, a second electromagnetic switching device for connecting said auxiliary motor to said source to provide operation of said synchronizing motors at threading speed, a time element device for delaying the operation of said second switching device a predetermined interval of time after operation of said first mentioned switching device, a third electromagnetic switching device for connecting substantially the entire portion of each of said primary windings to said source, and a time element means for delaying the operation of said third switching device for a predetermined interval of time after operation of said first mentioned switching device.

6. A plural motor drive for sectionalized printing presses and the like comprising a source of alternating current, a plurality of alternating current motors one for each section of the press and each provided with a primary winding and a secondary winding, said primary windings being provided with line terminals and with intermediate taps, a switching device for connecting said taps to said source so as to apply full line voltage to a portion of each of said primary windings, a second switching device for connecting said line terminals to said source so as to apply line voltage to substantially the entire portion of each of said windings, time element means for delaying the operation of said second switching device for a predetermined interval of time after operation of said first mentioned switching device, and means operated by said second switching device for disconnecting said intermediate taps from said source.

WALTER DE VRIES.